United States Patent
Messmer

(10) Patent No.: US 9,161,408 B2
(45) Date of Patent: Oct. 13, 2015

(54) COMPENSATION FOR SUB-PAR LIGHTING IN DISPLAYS

(75) Inventor: Neil W. Messmer, Langley (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 398 days.

(21) Appl. No.: 13/393,526

(22) PCT Filed: Jul. 26, 2010

(86) PCT No.: PCT/US2010/043187
§ 371 (c)(1),
(2), (4) Date: Feb. 29, 2012

(87) PCT Pub. No.: WO2011/028335
PCT Pub. Date: Mar. 10, 2011

(65) Prior Publication Data
US 2012/0162968 A1    Jun. 28, 2012

Related U.S. Application Data

(60) Provisional application No. 61/239,209, filed on Sep. 2, 2009.

(51) Int. Cl.
*G09F 13/04* (2006.01)
*H05B 33/08* (2006.01)
*G09G 3/34* (2006.01)
*G02F 1/1335* (2006.01)
*G09G 3/36* (2006.01)

(52) U.S. Cl.
CPC .......... *H05B 33/0845* (2013.01); *G09G 3/3426* (2013.01); *G02F 1/133603* (2013.01); *G09G 3/3611* (2013.01); *G09G 2320/0242* (2013.01); *G09G 2320/043* (2013.01); *G09G 2330/08* (2013.01); *G09G 2360/145* (2013.01)

(58) Field of Classification Search
CPC ................. G02F 1/133603; G09G 2320/0242; G09G 2320/043; G09G 2320/08; G09G 2360/145
USPC ........... 362/97.1–97.3, 600–630, 231, 249.02
See application file for complete search history.

(56) References Cited

U.S. PATENT DOCUMENTS

| | | | |
|---|---|---|---|
| 6,891,672 B2 | 5/2005 | Whitehead | |
| 7,403,332 B2 | 7/2008 | Whitehead | |
| 7,817,131 B2 | 10/2010 | Seetzen | |
| 2007/0291198 A1 | 12/2007 | Shen | |
| 2009/0078852 A1 | 3/2009 | Lin | |
| 2012/0140446 A1* | 6/2012 | Seetzen et al. | 362/97.1 |

FOREIGN PATENT DOCUMENTS

| | | |
|---|---|---|
| JP | 2007-108519 | 4/2007 |
| KR | 10-2004-0064719 | 7/2004 |
| WO | 03/077013 | 9/2003 |
| WO | 2008/092276 | 8/2008 |
| WO | 2008/094153 | 8/2008 |

* cited by examiner

*Primary Examiner* — Anh Mai
*Assistant Examiner* — Jessica M Apenteng
(74) *Attorney, Agent, or Firm* — John W. Carpenter

(57) ABSTRACT

LEDs near or surrounding a non-functional or sub-par LED are adjusted to compensate the sub-par LED. The compensation may include illumination (e.g., increased illumination of nearby LEDs to compensate for under illumination of a non-functional LED) or a shift in hue of the nearby LEDs to compensate for an opposite shift in hue of the sub-par LED.

3 Claims, 7 Drawing Sheets

COMPENSATION FOR SUB-PAR LIGHTING IN DISPLAYS

CROSS-REFERENCE TO RELATED APPLICATIONS

This application claims priority to U.S. Patent Provisional Application No. 61/239,209, filed 2 Sep. 2009, hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to lighting, and particularly to the light of backlights used in displays.

2. Discussion of Background

Electronic displays are used in a wide range of applications. Some electronic displays have a series of spatial light modulators, for example, a backlight (or modulated backlight) and a front modulator.

Elements of the spatial light modulators may be controlled, for example, in response to image data to yield an image that can be observed by viewers. The elements of some spatial light modulators are backlight elements which have multiple states or levels of illumination. The levels of illumination may be, for example, utilized to produce a low resolution version of a desired image which may then be further modulated by an LCD panel to produce a desired image.

Arrays of backlight elements, front modulators, and processing to produce the desired image may be configured, for example, as described in Whitehead et al., U.S. Pat. No. 6,891,672, the contents of which are incorporated herein by reference in their entirety for all purposes. Such arrangements comprise locally dimmed backlit displays, and may also be referred to as dual modulation displays.

In order to operate most efficiently, the backlight elements are calibrated, adjusted, or binned so as to have uniform qualities at a given illumination level. During a post-factory calibration phase, all LEDs in an array may be adjusted so that each LED has the same brightness when driven at the same PWM value. For backlights with RGB LEDs, the LEDs may be further calibrated to have the same hue.

SUMMARY OF THE INVENTION

The present inventor has realized the need to maintain backlight calibration over age and/or in light of defective or sub-par efficiency of a backlight element. The present invention provides a method, device, and other such products/processes to compensate for lighting elements with sub par efficiency and illumination (e.g., LEDs partially working or not at all).

In one embodiment, the present invention provides a method of lighting compensation, comprising, identifying a sub-par light source in a set of light sources, and applying additional driving to light sources near the sub-par light source in a manner that compensates for a deficiency caused by the sub-par light source. The step of identifying the sub-par light source may comprise, for example, analyzing a light detection value or color/hue value.

In one embodiment, the step of applying additional driving comprises applying additional driving to a "ring" of light sources surrounding the sub-par light source. The "ring" may comprise, for example, any of a geometric and non-geometric path near the sub-par light source, wherein the path may comprise any of a circle, rectangle, square, triangle, polygon, or other geometric shapes. The "ring" of light sources may comprise light sources within a band of area a predetermined distance from the sub-par LED.

In another embodiment, the step of applying additional driving comprises driving a first set of light sources near the sub-par light source at a first drive level and driving a second set of light sources near the sub-par light source at a second drive level, wherein the first and second drive levels comprise a variance from a drive level for each light source that would occur in the sub-par light source were operating at par. The first set of light sources comprises a first band of light sources surrounding the sub-par light source, and the second set of light sources comprises a second band of light sources surrounding the first band of light sources.

In yet another embodiment, the step of applying additional driving comprises causing a hue shift in the nearby light sources. The hue shift may be, for example, a shift in a direction that is spectrally opposite or opposed to a hue shift of the sub-par light source.

The light sources may comprise LEDs in a backlight of a display, and, may include, for example, adjustments prepared for a spatial modulator that, when implemented, compensate for changes in the backlight due to the additional driving. Generally, the various other embodiments of the invention may be embodied in a display or a controller configured to perform steps of a method configured to operate any aspect of the invention.

Portions of any devices, methods, or other forms of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
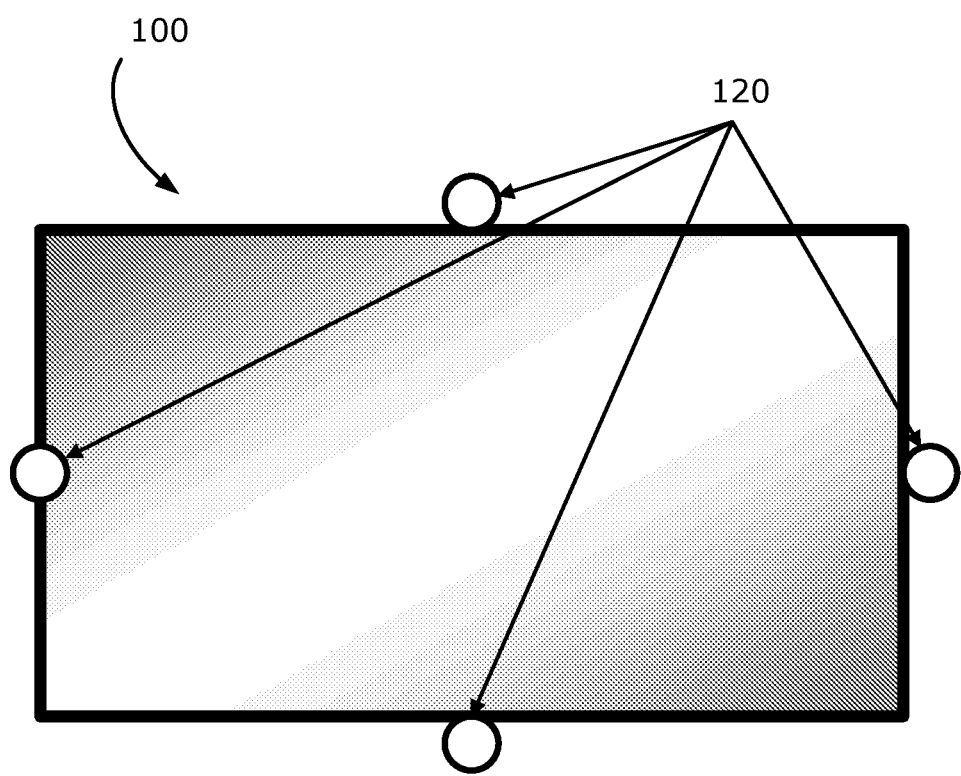
FIG. 1 is an illustration of a light/color sensor arrangement for a locally dimmed display.

Referring now to the drawings, wherein like reference numerals designate identical or corresponding parts, and more particularly to FIG. 1 thereof, there is illustrated a light sensor arrangement 120 for a locally dimmed display 100. The display 100 includes a series of light sources (e.g., LEDs—not shown in FIG. 1) for backlighting the display (e.g., illumination of an LCD panel with an approximation and/or a low resolution version of a desired image).

Over time, any number of electrical, chemical, or other issues may cause an LED (or other light source) in an array or group of lights to fail or perform sub-par. The present invention provides a method, device, and other such products/processes to compensate for lighting elements that fail or have/develop sub par efficiency and/or illumination (e.g., LEDs working or not).

The present invention may compensate or correct for these conditions and the following are provided as examples:

(1) LED Failure

Figure 2:
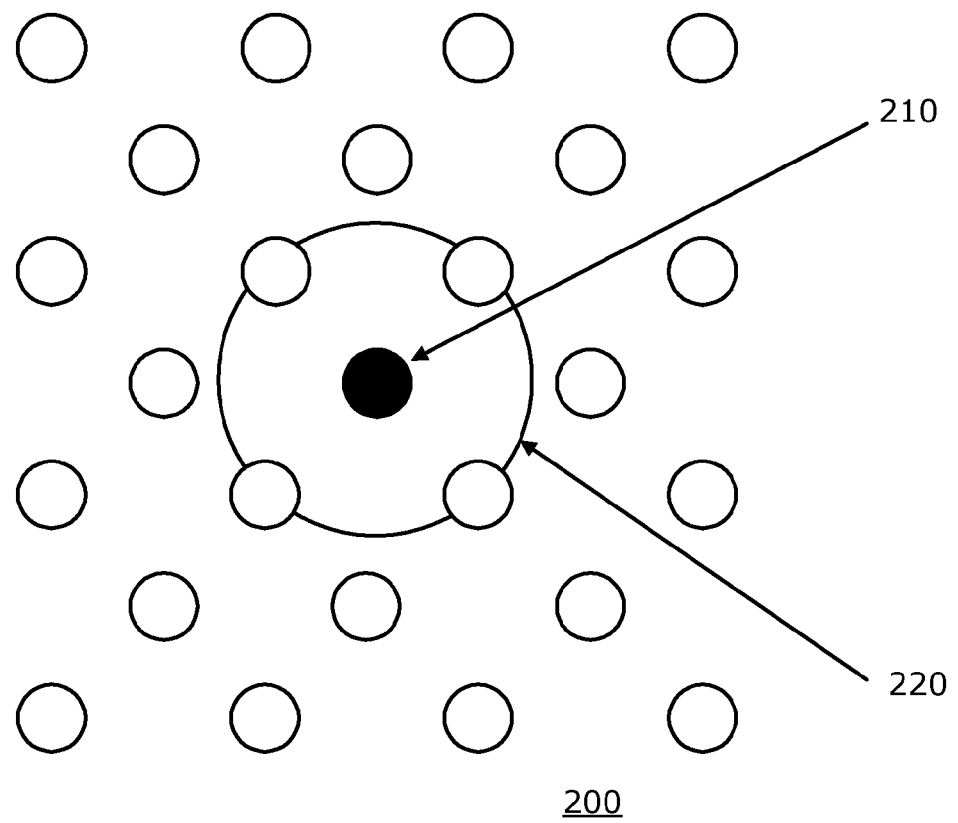
FIG. 2 is an illustration of a non-functioning LED in an array and a "ring" of LEDs driven for compensation according to an embodiment of the present invention.

An LED failure is detected. For example, as shown in FIG. 2, an LED array 200 includes a failed or sub-par (sub=-performing) LED 210. The failure is detected, for example, via a sensor/sensors (not shown) which may be arranged in an optical cavity of a display in which the LED array 200 is installed (e.g., the sensors may be similar to sensors 120). Failed or sub-par LED 210 is detected by the optical sensors due to a deviation or anomaly of the LF near the LED.

Knowing that LED 210 was to be driven at a specific value 'A', and knowing the expected Point Spread function (PSF) of LED 210, the surrounding LEDs (shown by ring 220) may be appropriately adjusted with additional drive power (or drive characteristics) such that the LF is compensated for the detected deviation/anomaly. The result is a Light Field (LF) in an area of the LED 210 that is equivalent or more closely approximates the intended LF.

(2) Hue Shift

With the use of color sensors hue shifts in the LF attributable to an LED (or other light source) can be detected. Typically, it is expected that for relatively small hue shifts this will be adjusted/compensated within an LED in question and/or its own driving circuitry (e.g., shifting the color of the LED in question away from the detected hue towards an intended or desired hue). In cases where the internal LED adjustment hits one or more adjustment limits, the surrounding LEDs are then driven in a manner that compensates for the detected hue shift. The compensatory driving of the surrounding LEDs may be done alone or in combination with adjustments within the deficient LED/LEDs and/or related driving circuitry.

For example, a deficient LED may be identified when being driven to yellow and the detected hue is shifted to red. A combination of the surrounding LEDs may be driven (or driven more) on their green dies to compensate for the error in hue of the deficient LED.

(3) Other Failures/Issues

Other failures or sub-par performance issues may also occur, for example, intermittent flickering or illumination/hue surges, long extended step response times of the LED die and other issues. In some cases, the sub-par or deficient LED may continue to operate. However, as in the cases of detection of flickering or surging LEDs, the LED may be disabled and then compensated for as any other non-functioning LED.

The "rings" of LEDs that are capable to be used for compensation depend on the system PSF (each LED's light spread upwards and outwards). By design, an LED's PSF encompasses the nearest surrounding LEDs. Although the width of an individual LED PSF may vary, it is very likely to encompass a larger area that would enable additional LED rings to be used in this manner.

Detection of deficient LEDs may be performed, for example, by taking readings from the sensors and comparing the readings to a corresponding portion of a light field simulation. The light field simulation may be for a standard pattern or may be calculated in real-time during viewing of an image (e.g., movie or other visual presentation).

Flickering or surging may be detected by comparing differences between the LFS and detected illuminations at a series of intervals. A frequency of readings and calculations of differences may be adjusted, for example, to match performance characteristics of the sensors (e.g., time needed for the sensors to settle or to read the sensors may be utilized as a maximum frequency) and available processing power within a display.

Detection of deficient LEDs may be performed at various times including, for example, at start-up, during a blanking interval, and/or while an image is being displayed. Compensation may be applied to the readings to account for an amount of reflectivity exhibited by the LCD panel due to a current state of the LCD panel (e.g., displayed pattern or image).

When the surrounding LEDs are already driven near their maximum drive (or at their maximum level of compensation), the algorithm utilizes the next level of surrounding LEDs to implement the compensation. For example, when ring 210 (or one or more LEDs on ring 210) is near to or reaches its maximum drive level, a second ring (e.g., ring 220) may be energized. In one embodiment, when ring 210 is within a predetermined drive level of its maximum, the second ring 200 is overdriven along with further increases in drive levels on ring 210 up to and including any maximums of ring 210. Such an arrangement may propagate out further, with additional rings energized at, preferably, increasingly lower amounts of overdrive so as to smooth out the delivery of the compensatory illumination.

Overdriving the LEDs enables to compensate for the above conditions. From the viewer's perspective, the additional brightness of the LEDs are compensated through the LCD pixels by driving them lower through the normal lightfield compensation. There is a percentage increase in drive levels that can be tolerated. As this watermark is reached for any compensation, the algorithm is enhanced to utilize additional LED rings.

As shown in FIG. 2, the "rings" may be LEDs that basically intersect on a circularly patterned shaped around the LED at issue. However, other geometries and non-geometric shapes may also be utilized. For example, a "ring" may be implemented as, for example, an octagonal, rectangular, or oval pattern of LEDs.

Figure 3:
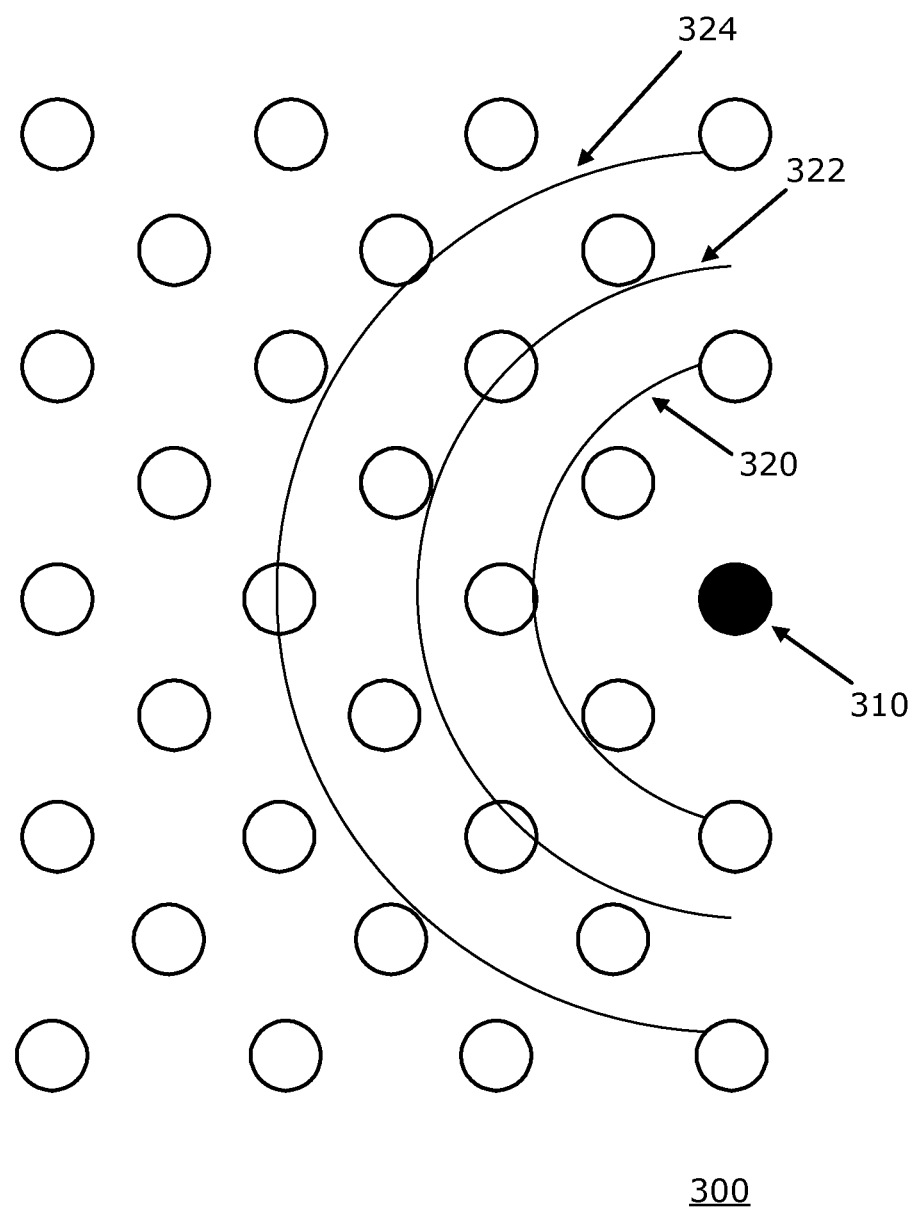
FIG. 3 is an illustration of a non-functioning LED on a side of an array and a series of LED "rings" driven for compensation according to an embodiment of the present invention.

In addition, half patterns as suitable for edge bearing LEDs, quarter patterns for corner located LEDs, and/or a distorted pattern for near edge/near corner LEDs may also be utilized. FIG. 3 is an illustration of a non-functioning LED 310 on a side of an array 300 and a series of LED "rings" 320, 322, and 324 driven for compensation according to an embodiment of the present invention. Illustrating the corner situation, FIG. 4 illustrates a non-functioning LED 410 in a corner of an array 400 and a series of LED "rings" 420, 422, and 424 driven for compensation according to an embodiment of the present invention.

The LEDs of a particular ring are generally, but not necessarily driven at same amount of overdrive. For example, in a ring constructed of a rectangular pattern of LEDs, the closest LEDs may be driven at the highest amount of overdrive and all other LEDs are driven at an amount of overdrive that is proportional to its distance from the deficient LED. In the case of a square "ring," the corners may be driven at a lower value. Regardless of the ring pattern or driving scheme, the result and energization levels of the LEDs are designed to compensate for and smooth the light field in and around the deficient LED.

In the case of the edge LED illustrated in FIG. 3, the "rings" are illustrated by arcs scribed to identify LEDs that would or would likely be included in a ring, and are not necessarily on the arc/ring, or equally spaced on/near the arc/ring, or a consistent distance from the arc/ring. In one embodiment, in this and other various examples, the LEDs may be driven relatively higher or lower depending on a distance from the non-functioning LED (LED 310 in this example), or based on a distance from the "ring."

Figure 4:
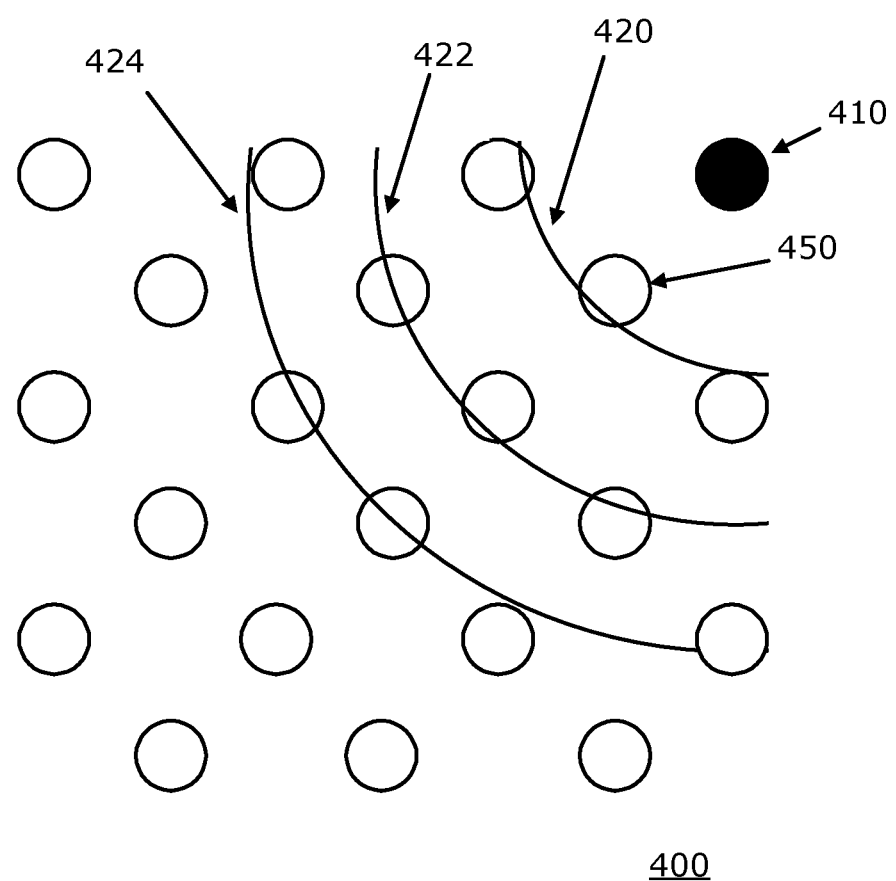
FIG. 4 is an illustration of a non-functioning LED in a corner of an array and a series of LED "rings" driven for compensation according to an embodiment of the present invention.

In special cases such as the edge or corner LEDs, the invention includes a modification of the process for driving the LED "rings." For example, due to highly efficient edge reflectors or other special cases, it may be advantageous to increase the drive of less than the entire "ring." In the corner case, as shown in FIG. 4, this may amount to driving LED 450 higher without its neighboring LEDs on the same ring/arc being driven higher (or driven higher but not as high as LED 450). Although such a scenario might not be the ideal compensation for the non-functioning LED 410, it may have some advantages depending other features of the image being displayed.

Algorithms for implementing the present invention may include, for example, a step of calculating a set of most advantageous set of LEDs to constitute the "ring." And, depending on features of the image ultimately being displayed, the ring, or set of LEDs on a particular ring for compensation may change on a scene-by-scene, frame-by-frame, or other basis. Such an algorithm may, for example, after identifying a sub-par LED, include the steps of (1) evaluating an image frame, (2) determining the best "ring," or group of LEDs and an amount of additional driving of each LED above the "normal" LED drive levels for the frame, and then (3) energizing the ring or group of LEDs with the additional driving to compensate for the identified sub-par LED.

It is worth noting that the additional driving of the LEDs may include, for example, energizing an LED that would have otherwise been off. In such cases and virtually every other case as well, counter compensation is performed at the LCD screen so that the areas outside or closer to the edges of the PSF being compensated for are not over illuminated by the backlight. It is possible that the LCD screen may not have sufficient levels of adjustment to adequately counter compensate for the additional illumination. In such cases, the driving algorithm may include, for example, the step of reducing the compensatory drive level on one or more of the LEDs on the "ring." The amount of reduced drive levels may also be evaluated in a step that examines a trade-off in picture quality between an over-illuminated compensation and an under illuminated (or off-hue) backlight.

Figure 5:
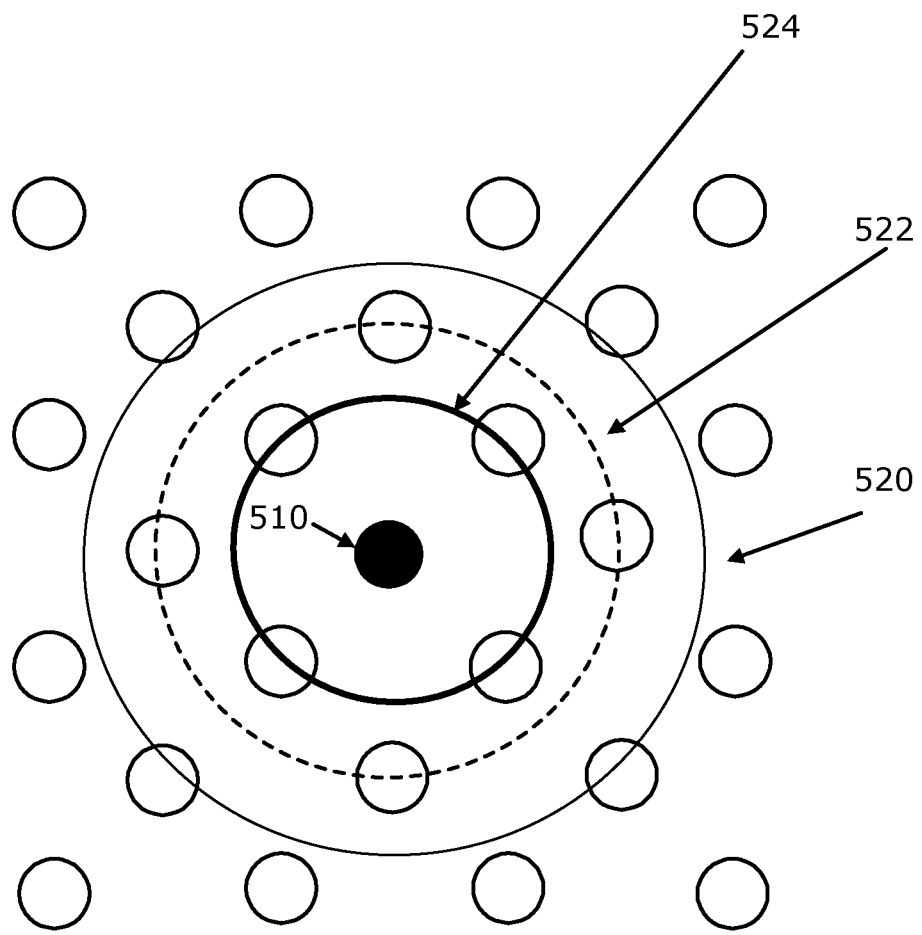
FIG. 5 is an illustration of a non-functioning LED in an array and a series of "rings" of LEDs driven for compensation according to an embodiment of the present invention.

FIG. 5 is an illustration of a non-functioning LED 510 in an array 500 and a series of "rings" of LEDs 520, 522, and 524 driven for compensation according to an embodiment of the present invention. In the illustrated embodiment, the non-functioning LED 510 is compensated for by additional driving of LED on ring 524. However, the added driving of ring 524 causes additional illumination in areas on and both inside and outside of the ring. To counter-compensate, in particular for added illumination outside the ring (and possibly to some extent light on or inside the ring—e.g., depending on the extent of the light spread function of the light source(s) and other factors such as size of the light sources, light source spacing, depth of the optical cavity, etc.), the second ring 522 is driven lower by a small amount (e.g., a proportionally smaller "under" drive on ring 522 than the amount of "over" drive applied to ring 524). Additional rings may be alternately driven higher or lower, and the amount of compensation and counter compensation quickly fades out and all remaining LEDs are energized as they would normally be driven for an entirely functional backlight. In the case of a hue shift a first ring may compensate with an opposite hue shift and a second ring may compensate using a counter compensatory hue shift. The same continuing for additional alternate rings. The present invention may also include a step of determining how many compensatory rings of alternating compensation and counter compensation should be implemented. And again, such determinations are made against the backdrop of the requirements for illuminating (LF simulation) and further modulating (e.g., modulating steps available in an LCD panel of the display) a current frame.

Figure 6:
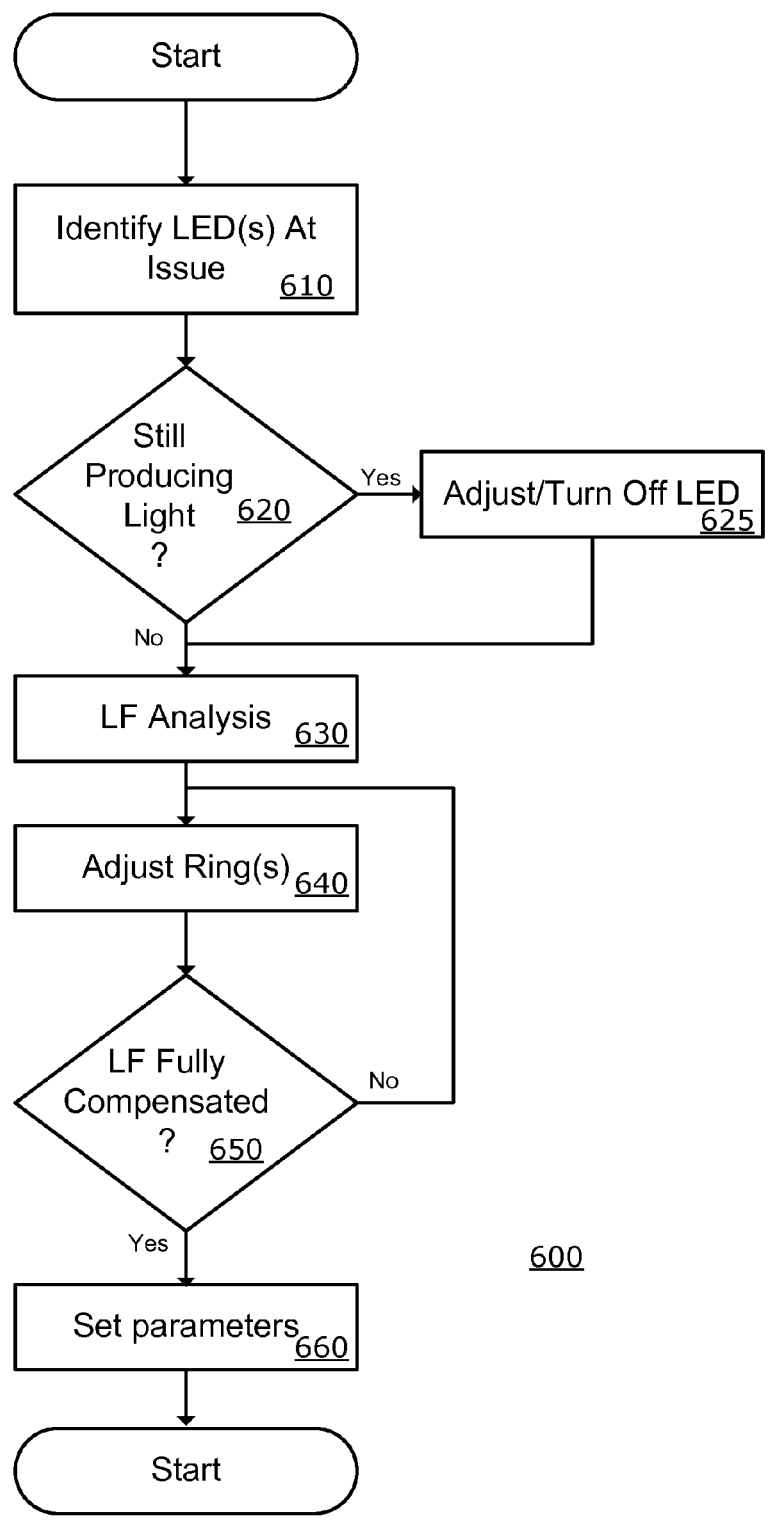
FIG. 6 is a flow chart of a process of Light Field (LF) testing and adjusting of LED rings to compensate for sub-par performance of at least one LED.

Various algorithms or processes may be implemented from the above discussion. FIG. 6 is a flow chart 600 of an example process of Light Field (LF) testing and adjusting of LED rings to compensate for sub-par performance of at least one LED in the light field. At step 610, one or more LEDs are identified as non-function or having sub-par performance. As noted above, light sensors may be utilized to determine LED issues. In addition, a circuitry test may also establish that an LED is not performing or not performing properly. For example, the absence of driving current may be detected which may indicate that the LED or driving circuitry is open. Unexplained surging of current in the driving circuit may indicate a similarly surging illumination by the LED. In such cases, the LED may be turned off (step 625) so that the process knows that it is dealing with a non-functional LED.

In cases utilizing light sensors, it may be verifiable that an LED is simply not as bright as intended but that the illumination available from the LED is sufficient to provide some of the desired backlighting. In such cases, the additional energization of additional rings is more of an assist to the sub-par LED rather than a replacement as in the case of a fully non-functional LED.

At step 630, a light field analysis is performed determining what adjustments or rings should be over/under energized by how much including illumination changes and hue shifts to bring the actual LF closer to the desired LF (the desired LF being that which would be produced by the backlight without non-functioning/sub-par LEDs). The "rings," or other identified groups of LEDs are then adjusted (step 640).

If the LF has not been fully compensated, or if, for example, the sensors indicate the LF is not compensated as well as would be expected (step 650), further adjustments may be made until an acceptable light field is produced.

At step 660, a variance or "delta" between the calculated compensated LF and the actual fully adjusted compensated LF may be saved and utilized in future calculations along with other parameters and/or variables determined in the previous steps. The present invention may include looking back at previously saved variables and settings (e.g., that may have been determined in an iterative environment) to establish appropriate drive levels for a current scenario (scene or arrangement of sub-par LEDs). Clearly, the present invention may also be applied to multiple sub-par functioning LEDs of a backlight.

Although the present invention has been described in the context of a display having a planar backlight of, for example, an N×M array (N rows, M columns), where N and M may be equal or different values, and the rows and columns may be evenly spaced, evenly spaced but offset, or patterned in any manner. The backlight may also be of an edge-lit configuration, and compensation may be performed by neighboring light sources on a same edge or other edges from the sub-par light source. In such cases, the described "ring" may refer to any light sources whose PSF makes any significant light contribution to an area that would be illuminated by the sub-par light source if it were operating at par.

Figure 7:
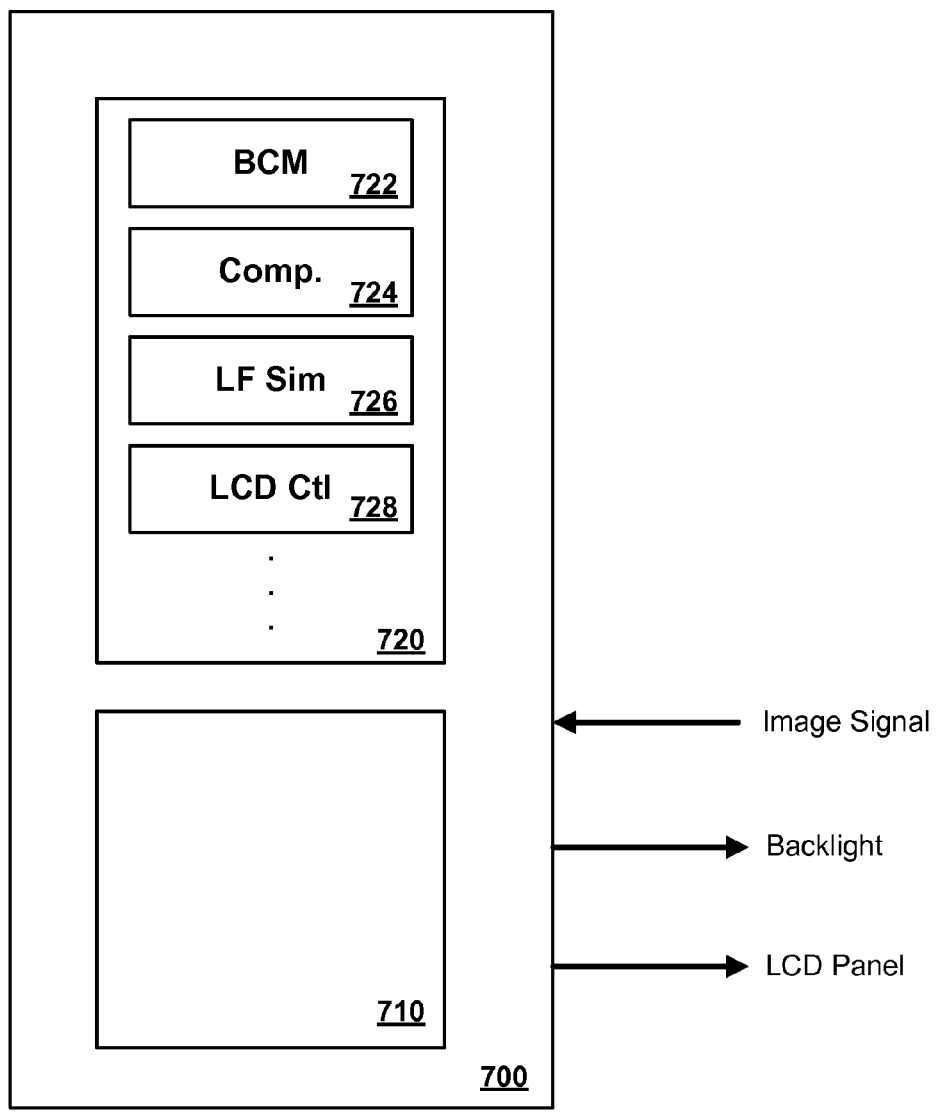
FIG. 7 is a controller according to an embodiment of the present invention.

The invention may be embodied as a controller 700 as illustrated in FIG. 7, which includes a processing unit 710 and program memory 720 including a backlight calculation module 722 configured to calculate drive levels for a series of light sources of a backlight, the drive levels based on an image signal. The controller also includes a backlight compensation calculation module (Comp. 724) configured to calculate compensatory drive levels for selected ones of the light sources to compensate for a light source with sub-par performance characteristics.

The controller 700 further includes a light field simulation module (LFS 726) configured to calculate a light field simulation for the backlight at the calculated and compensatory drive levels, and a spatial light modulator calculation module (LCD Ctl 728) configured to calculate color and pass-through illumination of a spatial light modulator based on the light filed simulation. The controller may be installed, for example, in a dual modulation HDR display 750 comprising an LED based backlight controlled by the backlight and backlight compensation modules and an LCD panel controlled by the spatial light modulator calculation module. The LED based backlight may have, for example, a physical structure comprising at least one of a N×M based backlight and an edge lit backlight.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing an LED based backlight, any other equivalent device, such as a backlight modulated by an additional LCD panel, electrowhetting, incandescent/florescent lighting, a phosphor arrangement, etc. or any other device having an equivalent function or capability, whether or not listed herein, may be substituted therewith. Furthermore, the inventor recognizes that newly developed technologies not now known may also be substituted for the described parts and still not depart from the scope of the present invention. All other described items, including, but not limited to backlights, backlight elements, color arrangements of backlight elements, shapes or sizes of rings or other adjustment groups of LEDs, algorithms, structures, reflectors, LCD panels (or other modulators), etc., should also be considered in light of any and all available equivalents.

Portions of the present invention may be conveniently implemented using a conventional general purpose or a specialized digital computer, microprocessor, FPGA, or the like programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, identifying non-functional or sub-par LEDs, determining groups of LEDs for compensation, determining "rings" of LEDs for compensation, determining individual levels of drive compensation for LEDs in groups or in "rings," performing light field analysis, further adjusting rings incrementally or iteratively, saving parameters, utilizing saved parameters for subsequent adjustments and the display, storage, or communication of results according to the processes of the present invention.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A display, comprising:
    a backlight comprising a set of light sources energizable at different levels so as to produce a modulated backlight;
    a spatial light modulator illuminated by the modulated backlight; and
    a processor configured to calculate:
        an adjustment of a first drive levels of a first ring of light sources so as to compensate for a sub-par performance of at least one light source of the set of light sources, the first ring of light sources surrounding the sub-par light source and selected from the set of light sources;

an adjustment of a second drive level of a second ring of light sources surrounding the first ring of light sources so as to counter-compensate for the first set of light sources driven at the first drive level, the second ring of light sources selected from the set of light sources, wherein the adjusted first and second drive levels comprise a variance from the first and second drive level of each light source that would occur if the sub-par light source were operating at par.

2. The display according to claim 1, wherein the processor is further configured to calculate adjustments in color and/or pass-through illumination of pixels in the spatial light modulator to compensate for variances in backlighting caused by either the sub-par light source and/or the adjusted first drive level.

3. The display according to claim 1, wherein the set of light sources comprise RGB LEDs and the adjustments of the first and second drive levels comprises shifting a hue in the first and second rings of light sources, wherein the hue shift of the first ring of light sources is in a direction spectrally opposite a hue shift of the sub-par light source and the hue shift of the second ring of light sources is counter-compensatory of the hue shift of the first ring of light sources.

* * * * *